US011432560B2

(12) United States Patent
Almazloum et al.

(10) Patent No.: US 11,432,560 B2
(45) Date of Patent: Sep. 6, 2022

(54) AUTOMATED YOGURT MAKER

(71) Applicants: Maya Almazloum, Omaha, NE (US); Faisal K. Abou-Nasr, Omaha, NE (US)

(72) Inventors: Maya Almazloum, Omaha, NE (US); Faisal K. Abou-Nasr, Omaha, NE (US)

(*) Notice: Subject to any disclaimer, the term of this patent is extended or adjusted under 35 U.S.C. 154(b) by 0 days.

(21) Appl. No.: 17/159,091

(22) Filed: Jan. 26, 2021

(65) Prior Publication Data

US 2021/0145013 A1 May 20, 2021

Related U.S. Application Data

(60) Provisional application No. 62/975,881, filed on Feb. 13, 2020.

(51) Int. Cl.
*A23C 9/12* (2006.01)
*A23C 9/123* (2006.01)

(52) U.S. Cl.
CPC ............ *A23C 9/1226* (2013.01); *A23C 9/123* (2013.01)

(58) Field of Classification Search
CPC .............................. A23C 9/1226; A23C 9/123

USPC ......................................................... 99/452
See application file for complete search history.

(56) References Cited

U.S. PATENT DOCUMENTS

2018/0303273 A1* 10/2018 Perentes ............... A47J 31/521
2019/0174784 A1* 6/2019 D'Argence Vargas ...................... A23C 9/1238

* cited by examiner

*Primary Examiner* — Brent T O'Hern
(74) *Attorney, Agent, or Firm* — Nasr Patent Law LLC; Faisal K. Abou-Nasr

(57) ABSTRACT

An automated yogurt maker includes: a first container configured to receive milk; a first heating element configured to heat the milk to a scalding temperature; a capsule holder configured to hold a yogurt starter capsule; a nozzle configured to direct the milk into the yogurt starter capsule; a pump configured to pump the milk from the first container to the nozzle so that the milk flows through the nozzle into the yogurt starter capsule and mixes with the yogurt starter; a second container configured to receive the mixture of the milk and the yogurt starter; and a second heating element configured to maintain the temperature of the mixture at an incubation temperature while the mixture incubates to produce yogurt.

6 Claims, 3 Drawing Sheets

AUTOMATED YOGURT MAKER

CROSS-REFERENCE TO RELATED APPLICATIONS

The present application claims the benefit under 35 U.S.C. § 119(e) of U.S. Provisional Application Ser. No. 62/975,881, filed Feb. 13, 2020, and titled "AUTOMATED YOGURT MAKER," which is incorporated herein by reference in its entirety.

TECHNICAL FIELD

The present disclosure relates to small appliances and, more particularly, to small appliances for dairy products.

BACKGROUND

Homemade yogurt has several benefits. For example, homemade yogurt has less sugar content, while store bought yogurt is usually high in sugar. Homemade yogurt can have better quality ingredients. For instance, with homemade yogurt a consumer gets to choose the milk and anything used to flavor the yogurt. Homemade yogurt also allows for control over the yogurt starter and the process. Being able to choose the yogurt starter is important because different probiotic cultures can affect taste and texture. A person might also be able to digest certain yogurt cultures more easily than others.

Homemade yogurt lets consumers pick what is best for them. Thus, it is believed that the convenience of a fully automated yogurt maker would benefit many yogurt consumers in the US and elsewhere in the world.

SUMMARY

Aspects of this disclosure relate to an automated yogurt maker that turns the time-consuming process of making yogurt into a two-step process that takes a minute or two of user time. The key to making a fully automated yogurt maker is solving the "stirring problem." Part of the yogurt making process requires a yogurt starter to be stirred into hot milk. Because of this step, other yogurt makers are not fully automated. Instead, they require the user to stir the yogurt and then pour it into smaller containers for fermentation. The automated yogurt maker uses technology similar to the capsules and pressurized nozzles that are used in single server coffee makers, such as Keurig and Nespresso machines, to make it possible for users to simply pour milk into the machine, insert a yogurt starter capsule, and start making yogurt with the press of a button.

In embodiments, the automated yogurt maker includes: a first container configured to receive milk; a first heating element configured to heat the milk to a scalding temperature; a capsule holder configured to hold a yogurt starter capsule; a nozzle configured to direct the milk into the yogurt starter capsule; a pump configured to pump the milk from the first container to the nozzle, so that the milk flows through the nozzle into the yogurt starter capsule and mixes with the yogurt starter; a second container configured to receive the mixture of the milk and the yogurt starter; and a second heating element configured to maintain the temperature of the mixture of the milk and the yogurt starter at an incubation temperature while the mixture of the milk and the yogurt starter incubates to produce yogurt.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Figure 1:
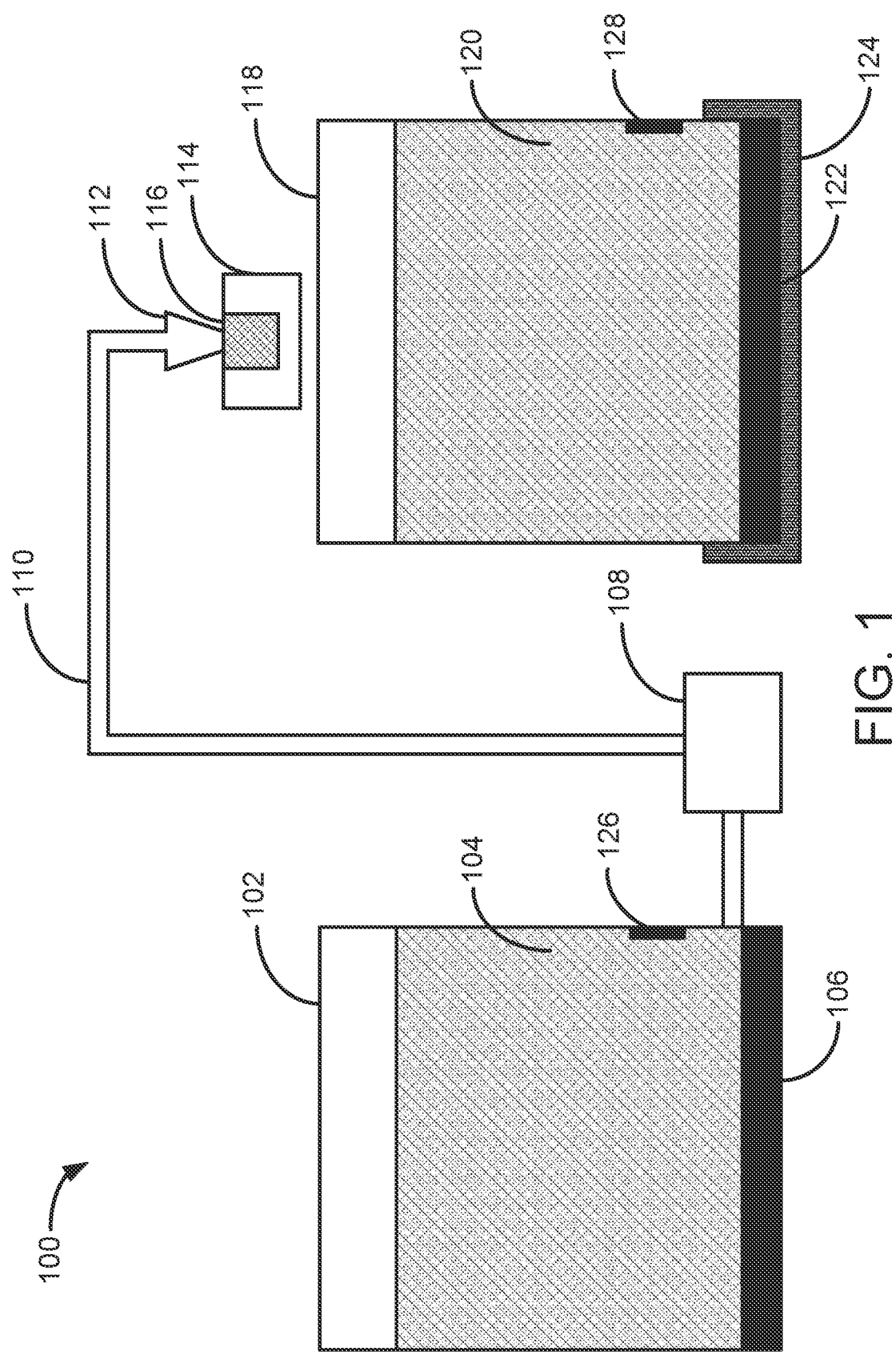
FIG. 1 is a schematic illustration of an automated yogurt maker, in accordance with one or more embodiments of the present disclosure.

FIG. 1 is a schematic illustration of an automated yogurt maker 100, in accordance with one or more embodiments of the present disclosure.

The automated yogurt maker 100 includes a first container 102 configured to receive milk 104. For example, a user can pour the milk 104 into the first container 102. Alternatively, the first container 102 may actually be an intermediate container. For example, the first container 102 may receive the milk 104 after the milk 104 flows and/or gets pumped in from another container or chamber that the milk 104 is initially poured into. In some embodiments, the first container 102 has a lid. In other embodiments, the first container 102 does not have a lid.

The automated yogurt maker 100 further includes a first heating element 106 configured to heat the milk 104 in the first container 102 (or in an intermediate container, chamber, or fluid path) to a scalding temperature. The scalding temperature may be in the range of 140 to 220 degrees Fahrenheit, or more particularly 160 to 200 degrees Fahrenheit for certain applications. A preferred scalding temperature may be even more particularly in the range of 175 to 195 degrees Fahrenheit.

In some embodiments, the first heating element 106 is a hot plate or a thermally conductive coil. In other embodiments, the first heating element 106 is an infrared or inductive heating pad. Alternatively, the first heating element 106 may be a thermal probe configured to heat the milk 104 directly from within the first container 102 (or another container, chamber, or fluid path).

The automated yogurt maker 100 further includes a capsule holder 114 configured to hold a yogurt starter capsule 116. The yogurt starter capsule 116 may be made from plastic, filter paper/cloth, metal (e.g., aluminum foil), or a combination of materials. The yogurt starter capsule 116 includes a yogurt starter (e.g., yogurt or dried/freeze-dried yogurt power). Yogurt starter capsules 116 that include non-dried yogurt may need to be refrigerated at all times prior to use.

The automated yogurt maker 100 further includes a nozzle 112 positioned next to or disposed within the capsule holder 114. The nozzle 112 is configured to direct the milk 104 into the yogurt starter capsule 116. The nozzle 112 is connected to tubing 110 that defines a fluid path from the first container 102 to the nozzle 112. The automated yogurt maker 100 further includes a pump 108 (e.g., a peristaltic pump, pneumatic pump, or the like) connected to the tubing 110. The pump 108 is configured to pump the milk 104 from the first container 102, through tubing 110, to the nozzle 112 so that the milk 104 flows through the nozzle 112 into the yogurt starter capsule 116 and mixes with the yogurt starter. The pump 108 can be configured to pump the milk 104 from the first container 102 to the nozzle 112. In some embodiments, prior to pumping the milk 104 from the first container 102 through the nozzle 112, the milk 104 is allowed to cool back down to a reduced temperature in the range of 90 to 140 degrees Fahrenheit.

In some embodiments, the nozzle 112 is a high-pressure nozzle that is configured to deliver milk 104 from the nozzle 112 at a high enough pressure to sufficiently mix the milk 104 with the yogurt starter. In other embodiments, the automated yogurt maker 100 further includes a rotating element in the capsule holder 114 to stir or whip the mixture of the milk and the yogurt starter so that the milk and the yogurt starter are sufficiently mixed together. Alternatively, or additionally, the automated yogurt maker 100 may include a rotating element in the second container 118 (or another container/chamber). In embodiments, a rotating element may include, but is not limited to, a whisk, magnetic stirrer, stir rod, whip, rotating porous disk, mixer head, or the like.

The automated yogurt maker 100 further includes a second container 118 configured to receive the mixture 120 of the milk 104 and the yogurt starter. For example, the mixture 120 can flow from the capsule holder 114 to the second container 118. In some embodiments, the second container 118 is the same size as or similar or the first container 102. In other embodiments, the second container 118 has several partitions so that the mixture 120 can be divided up into smaller batches. This can help with the formation of more evenly distributed yogurt cultures. In other embodiments, the second container 118 is one of several smaller containers that are configured to receive the mixture 120 of the milk 104 and the yogurt starter.

The automated yogurt maker 100 further includes a second heating element 122 configured to maintain the temperature of the mixture 120 of the milk 104 and yogurt starter at a controlled incubation temperature while the mixture 120 incubates to produce yogurt in the second container 118 (or another container/chamber). The incubation temperature may be in the range of 90 to 140 degrees Fahrenheit, or more particularly 100 to 120 degrees Fahrenheit for certain applications. A preferred incubation temperature may be even more particularly in the range of 105 to 115 degrees Fahrenheit.

In some embodiments, the second heating element 122 is a hot plate or a thermally conductive coil. In other embodiments, the second heating element 122 is an infrared or inductive heating pad. Alternatively, the second heating element 122 may be a thermal probe configured to heat the mixture 120 directly from within the second container 118 (or another container/chamber).

The automated yogurt maker 100 may further include a cooling element 124 (e.g., a Peltier plate, chiller, refrigeration tank, or the like) configured to reduce the temperature of the yogurt to a refrigeration temperature after the mixture 120 of the milk 104 and yogurt starter incubates for at least 4 hours to produce the yogurt. The refrigeration temperature may be in the range of 30 to 50 degrees Fahrenheit, or more particularly in the range of 33 to 40 degrees Fahrenheit for certain applications.

In some embodiments, the automated yogurt maker 100 may further include a first sensor 126 (e.g., a thermometer, thermistor, thermal diode, or any other temperature sensor/detector) configured to measure the temperature of the milk 104 in the first container 102 (or another container, chamber, or fluid path), and the first heating element 106 may be controlled based on the first sensor 126. Similarly, in some embodiments, the automated yogurt maker 100 may further include a second sensor 128 (e.g., a thermometer, thermistor, thermal diode, or any other temperature sensor/detector) configured to measure the temperature of the mixture 120 of the milk 104 and yogurt starter in the second container 118, and the second heating element 122 may be controlled based on the second sensor 128. In some embodiments, the cooling element 124 can also be controlled based on the second sensor 128.

Figure 2:
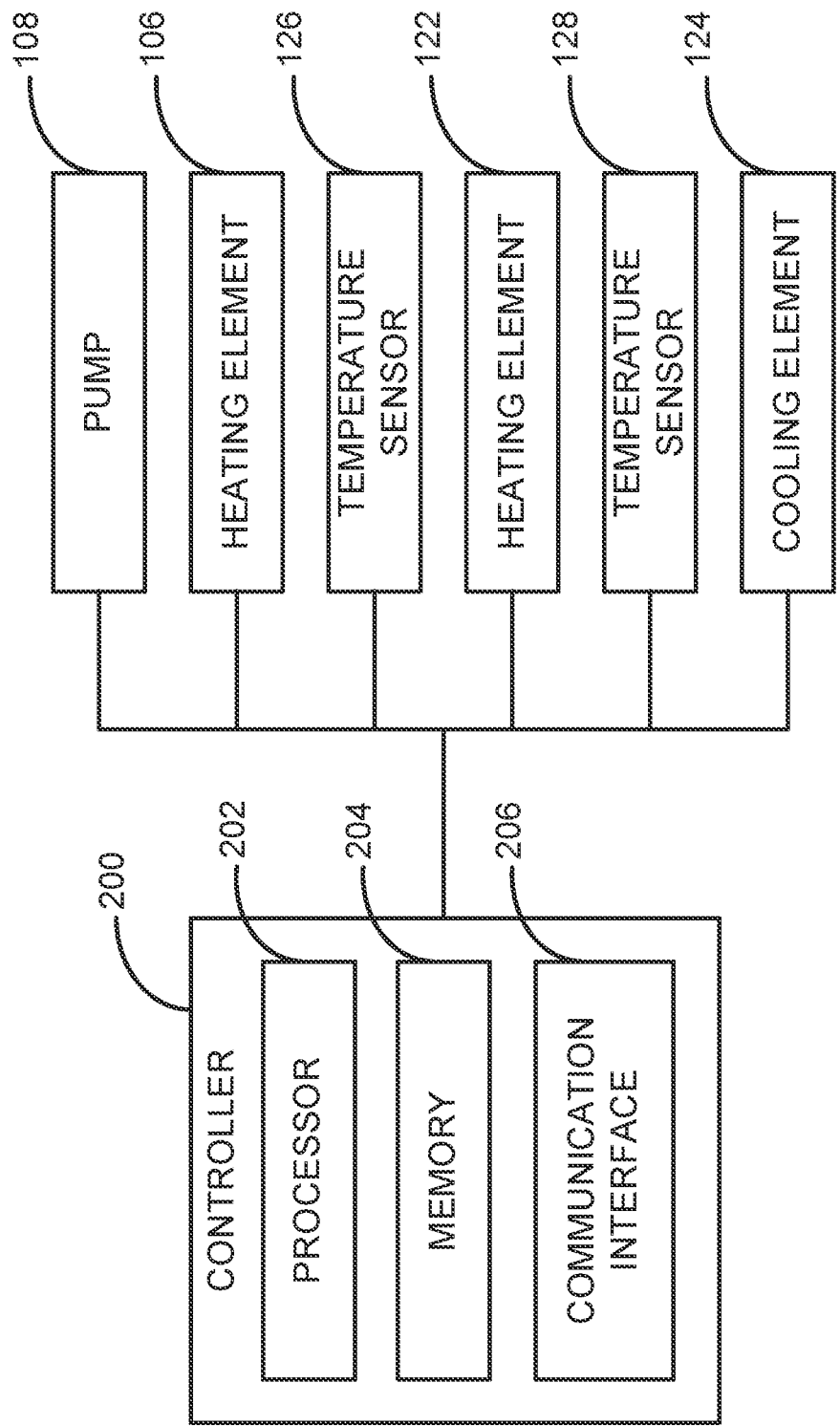
FIG. 2 is a block diagram illustrating a controller for the automated yogurt maker of FIG. 1, in accordance with one or more embodiments of the present disclosure.

As shown in FIG. 2, the automated yogurt maker 100 may include at least one controller 200 communicatively coupled with electronic components of the automated yogurt maker 100 (e.g., pump 108, heating element 106, sensor 126, heating element 122, sensor 128, cooling element 124, etc.). In embodiments, the controller 200 may be configured to receive signals from sensors 126 and 128 and may be further configured to generate control signals for the pump 108, the first heating element 106, the second heating element 122, and the cooling element 124 based on the signals received from the sensors 126 and 128. The controller 200 can also be configured to control the pump 108, the first heating element 106, the second heating element 122, and the cooling element 124 based on programmed time sequences and user inputs.

The controller 200 may include, but is not limited to, at least one processor 202, memory 204, and communication interface 206.

The processor 202 provides processing functionality for at least the controller 200 and can include any number of microprocessors, microcontrollers, circuitry, field programmable gate array (FPGA) or other processing systems, and resident or external memory for storing data, executable code, and other information accessed or generated by the controller 200. The processor 202 can execute one or more software programs embodied in a non-transitory computer readable medium (e.g., memory 204) that implement techniques/operations described herein. The processor 202 is not limited by the materials from which it is formed or the processing mechanisms employed therein and, as such, can be implemented via semiconductor(s) and/or transistors (e.g., using electronic integrated circuit (IC) components), and so forth.

The memory 204 may include a tangible, computer-readable storage medium that provides storage functionality to store various data and/or program code associated with operation of the controller 200 and/or the processor 202, such as software programs and/or code segments, or other data to instruct the processor 202, and possibly other components of the controller 200, to perform the functionality described herein. Thus, the memory 204 can store data, such as a program of instructions for operating the controller 200, including its components (e.g., processor 202, communication interface 206, etc.). It should be noted that while a single memory is described, a wide variety of types and combinations of memory (e.g., tangible, non-transitory memory) can be employed. The memory 204 can be integral with the processor, can comprise stand-alone memory, or can be a combination of both. Some examples of the memory can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 206 may be operatively configured to communicate with components of the controller 200. For example, the communication interface 206 can be configured to retrieve data from the processor 202 or other devices, transmit data for storage in the memory 204, retrieve data from storage in the memory 204, and so forth. The communication interface 206 can also be communicatively coupled with the processor 202 to facilitate data transfer between components of the controller 200 and the processor 202. It should be noted that while the communication interface 206 is described as a component of the controller 200, one or more components of the communication interface 206 can be implemented as external components communicatively coupled to the controller 200 via a physical (e.g., wired) and/or wireless connection. The controller 200 can also include and/or connect to one or more input/output (I/O) devices (e.g., via the communication interface 206), such as an input device (e.g., a mouse, a trackball, a trackpad, a joystick, a touchpad, a touchscreen, a keyboard, a keypad, a microphone (e.g., for voice commands), etc.) and/or an output device (e.g., a display, a speaker, a tactile feedback device, etc.). In embodiments, the communication interface 206 may also include or may be coupled with a transmitter, receiver, transceiver, physical connection interface, or any combination thereof.

It shall be understood that the operations performed by the automated yogurt maker 100 are not necessarily all performed by one controller 200. In some embodiments, the operations may be performed by one or more controllers 200. For example, one or more operations and/or sub-operations may be performed by a first controller, additional operations and/or sub-operations may be performed by a second controller, and so forth. Furthermore, some of the operations and/or sub-operations may be performed in parallel and not necessarily in the order that they are disclosed herein.

Figure 3:
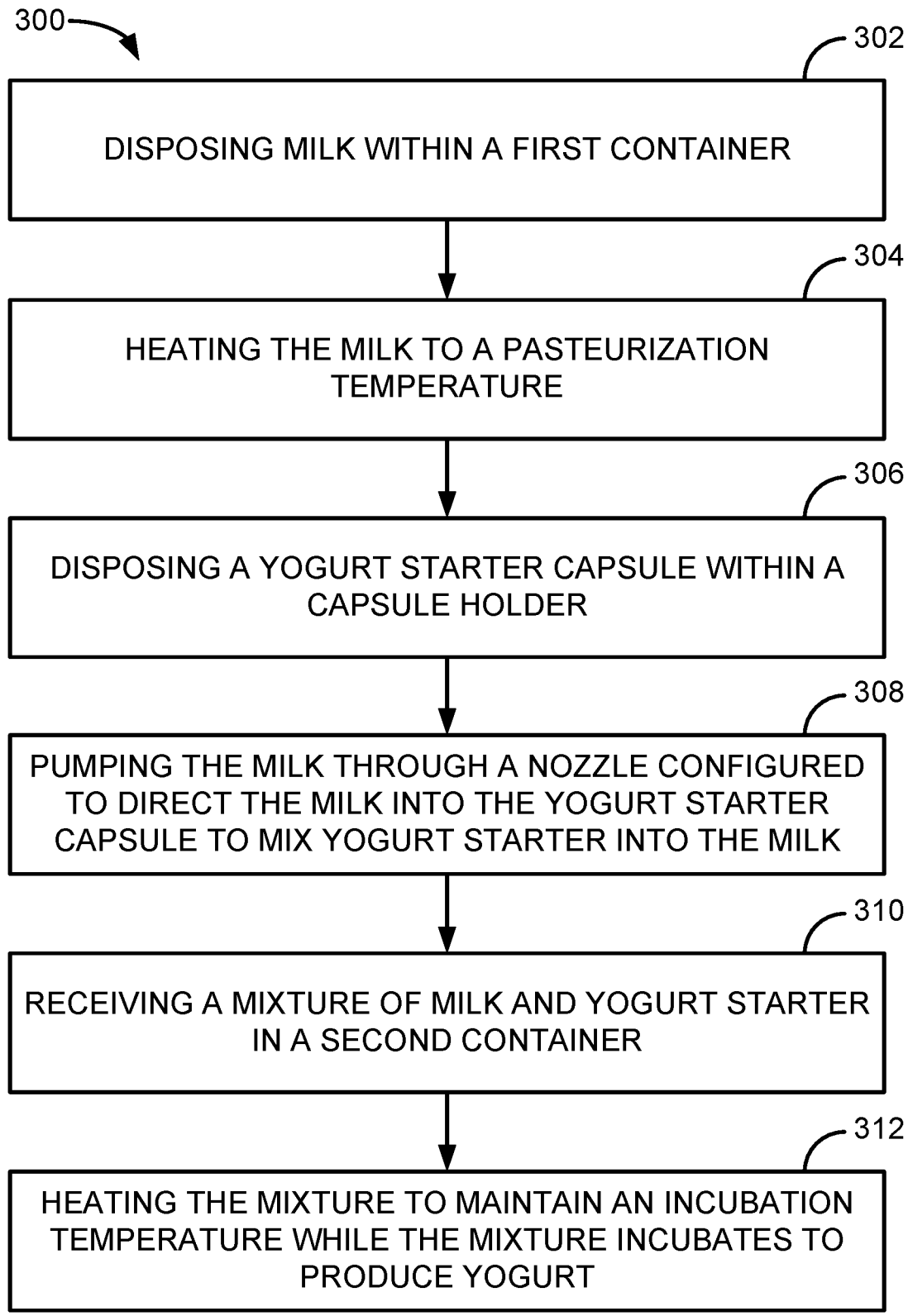
FIG. 3 is a flow diagram illustrating a method for making yogurt with an automated yogurt maker, such as the automated yogurt maker of FIG. 1, in accordance with one or more embodiments of the present disclosure.

FIG. 3 is a flow diagram illustrating an example implementation of a method 300 for making yogurt, in accordance with an example embodiment of the present disclosure. In general, operations of disclosed processes (e.g., method 300) may be performed in an arbitrary order, unless otherwise provided herein.

At step 302, milk 104 is disposed within a first container 102. For example, a predetermined amount (e.g., 8 ounces, 12 ounces, 16 ounces, etc.) or user-selected amount of milk 104 may be poured into the first container 102. Alternatively, the first container 102 may actually be an intermediate container. For example, the first container 102 may receive the milk 104 after the milk 104 flows and/or gets pumped in from another container or chamber that the milk 104 is initially poured into. In some embodiments, a yogurt starter capsule 116 includes an indication of a required amount of milk for making yogurt with the yogurt starter capsule 116. Alternatively, the size or shape of a yogurt starter capsule 116 may indicate the required amount of milk for making yogurt with the yogurt starter capsule 116.

At step 304, the milk 104 is heated to a scalding temperature in the first container 102 (or another container, chamber, or fluid path). For example, the controller 200 may be configured to cause the first heating element 106 to heat the milk 104 to a scalding temperature. The scalding temperature may be in the range of 140 to 220 degrees Fahrenheit, or more particularly 160 to 200 degrees Fahrenheit for certain applications. A preferred scalding temperature may be even more particularly in the range of 175 to 195 degrees Fahrenheit. In some embodiments, the controller 200 is configured to cause the heating element 106 to maintain the temperature of the milk 104 at the scalding temperature (or temperature range) for a predetermined (e.g., programmed or user-input) amount of time (e.g., 5 to 10 seconds, 15 to 60 seconds, 1 to 5 minutes, or more). The predetermined amount time may be dependent upon other factors, such as the scalding temperature and/or the amount of milk.

At step 306, a yogurt starter capsule 116 disposed within a capsule holder 114. For example, a yogurt starter capsule 116 can be placed within the capsule holder 114 by the user or can be automatically dropped into the capsule holder 114 from a preloaded cartridge or conveyor system.

At step 308, milk 104 is pumped from the first container 102 through a nozzle 112 configured to direct the milk 104 into the yogurt starter capsule 116 so that the milk 104 flows through the nozzle 112 into the yogurt starter capsule 116 and mixes with the yogurt starter. For example, the controller 200 may be configured to cause the pump 108 to pump the milk 104 from the first container 102, through tubing 110, to the nozzle 112 so that the milk 104 flows through the nozzle 112 into the yogurt starter capsule 116 and mixes with the yogurt starter. In some embodiments, prior to pumping the milk 104 from the first container 102 through the nozzle 112, the milk 104 is allowed to cool back down to a reduced temperature in the range of 90 to 140 degrees Fahrenheit.

At step 310, the mixture 120 of the milk and the yogurt starter is received within in a second container 118. For example, the mixture 120 may be dispensed from the yogurt starter capsule 116 and/or pumped into the second container 118 after being directed through the yogurt starter capsule 116.

At step 312, the mixture 120 of the milk and the yogurt starter is heated to maintain the temperature of the mixture 120 at an incubation temperature while the mixture 120 incubates to produce yogurt in the second container 118 (or in another container/chamber). For example, the controller 200 may be configured to cause the second heating element 122 to maintain the temperature of the mixture 120 at a controlled incubation temperature while the mixture 120 incubates to produce yogurt. The incubation temperature may be in the range of 90 to 140 degrees Fahrenheit, or more particularly 100 to 120 degrees Fahrenheit for certain applications. A preferred incubation temperature may be even more particularly in the range of 105 to 115 degrees Fahrenheit. In some embodiments, the controller 200 is configured to cause the heating element 122 to maintain the temperature of the mixture 120 at the incubation temperature (or temperature range) for a predetermined (e.g., programmed or user-input) amount of time (e.g., 2 to 4 hours, 4 to 6 hours, 6 to 8 hours, or more). The predetermined amount time may be dependent upon other factors, such as the incubation temperature, the amount of milk, and/or the amount of yogurt starter.

In some implementations, the yogurt produced in the second container 118 (or in another container/chamber) is cooled to reduce a temperature of the yogurt to a refrigeration temperature after the mixture of the milk and the yogurt starter incubates for a predetermined amount of time. For example, the controller 200 may be configured to cause the cooling element 124 to reduce the temperature of the yogurt to a refrigeration temperature after the mixture 120 of the milk 104 and yogurt starter incubates for the predetermined amount of incubation time. The refrigeration temperature may be in the range of 30 to 50 degrees Fahrenheit, or more particularly in the range of 33 to 40 degrees Fahrenheit for certain applications.

The method 300 may further include any step or operation implied or required by the embodiments of automated yogurt maker 100 described herein. Similarly, the automated yogurt maker 100 may also include any additional component or functionality expressed or implied by the method 300.

In an example use scenario, a user may load the milk 104 and yogurt starter capsule 116 into the automated yogurt maker 100. The user can then initiate the yogurt making process (e.g., by pressing a button). The automated yogurt maker 100 can then automatically perform the yogurt making process (e.g., steps 304 through 312 of method 300) and provide yogurt within a few hours (e.g., 2 to 4 hours, 4 to 6 hours, 6 to 8 hours, or the like). In some implementations, the yogurt is then cooled and kept at a refrigeration temperature until the user removes the yogurt from the automated yogurt maker 100 to consume or store the yogurt for future consumption. Using this simple process, a user may, for instance, produce yogurt overnight and then wakeup to cooled yogurt that is ready for consumption.

Although the technology has been described with reference to the embodiments illustrated in the attached drawing figures, equivalents may be employed and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. An automated yogurt maker, comprising:
   a first container configured to receive milk;
   a first heating element configured to heat the milk in the first container to a scalding temperature between 140 degrees Fahrenheit and 220 degrees Fahrenheit;
   a capsule holder configured to hold a yogurt starter capsule;
   a nozzle configured to direct the milk into the yogurt starter capsule;
   a pump configured to pump the milk from the first container to the nozzle, after the milk has been heated to the scalding temperature and maintained at the scalding temperature for a first predetermined amount of time, so that the milk flows through the nozzle into the yogurt starter capsule and mixes with the yogurt starter to form a mixture of the milk and the yogurt starter;
   a second container configured to receive the mixture of the milk and the yogurt starter; and
   a second heating element configured to maintain the mixture of the milk and the yogurt starter in the second container at an incubation temperature between 90 degrees Fahrenheit and 140 degrees Fahrenheit for a second predetermined amount of time while the mixture of the milk and the yogurt starter incubates to produce yogurt.

2. The automated yogurt maker of claim 1, further comprising a rotating element in the capsule holder to stir or whip the mixture of the milk and the yogurt starter.

3. The automated yogurt maker of claim 1, further comprising a first sensor configured to measure a temperature of the milk, wherein the first heating element is controlled based on the first sensor.

4. The automated yogurt maker of claim 3, further comprising a second sensor configured to measure a temperature of the mixture of the milk and the yogurt starter, wherein the second heating element is controlled based on the second sensor.

5. The automated yogurt maker of claim 1, wherein the second container is smaller than the first container, and the second container is one of several containers that are configured to receive the mixture of the milk and the yogurt starter.

6. The automated yogurt maker of claim 1, further comprising a cooling element configured to reduce a temperature of the yogurt to a refrigeration temperature between 33 degrees Fahrenheit and 40 degrees Fahrenheit after the mixture of the milk and the yogurt starter incubates for the second predetermined amount of time.

* * * * *